(12) United States Patent
Olmschenk

(10) Patent No.: US 11,138,502 B2
(45) Date of Patent: Oct. 5, 2021

(54) FOILING NEUROMORPHIC HARDWARE LIMITATIONS BY RECIPROCALLY SCALING CONNECTION WEIGHTS AND INPUT VALUES TO NEURONS OF NEURAL NETWORKS

(71) Applicant: International Business Machines Corporation, Armonk, NY (US)

(72) Inventor: Gregory M. Olmschenk, Brooklyn, NY (US)

(73) Assignee: International Business Machines Corporation, Armonk, NY (US)

( * ) Notice: Subject to any disclaimer, the term of this patent is extended or adjusted under 35 U.S.C. 154(b) by 828 days.

(21) Appl. No.: 15/968,108

(22) Filed: May 1, 2018

(65) Prior Publication Data

US 2019/0340500 A1 Nov. 7, 2019

(51) Int. Cl.
*G06N 3/08* (2006.01)
*G06N 3/067* (2006.01)
*G06N 3/04* (2006.01)

(52) U.S. Cl.
CPC ............. *G06N 3/08* (2013.01); *G06N 3/04* (2013.01); *G06N 3/0472* (2013.01); *G06N 3/067* (2013.01)

(58) Field of Classification Search
CPC ...................................................... G06N 3/08
See application file for complete search history.

(56) References Cited

U.S. PATENT DOCUMENTS

| | | |
|---|---|---|
| 6,424,961 B1 | 7/2002 | Ayala |
| 8,468,109 B2 | 6/2013 | Moussa et al. |
| 2006/0224532 A1 | 10/2006 | Duan et al. |
| 2016/0026912 A1 | 1/2016 | Falcon et al. |
| 2017/0024642 A1 | 1/2017 | Xiong et al. |
| 2019/0042935 A1* | 2/2019 | Deisher .................. G06N 3/063 |
| 2019/0171927 A1* | 6/2019 | Diril ........................ G06N 3/04 |

OTHER PUBLICATIONS

Withagen, H., "Reducing the effect of quantization by weight scaling", 1994 IEEE World Congress on Computational Intelligence, 1994 IEEE International Conference on Neural Networks, 1994, Jun. 28-Jul. 2, 1994, 3 pages, Abstract only.

(Continued)

*Primary Examiner* — Benjamin P Geib
(74) *Attorney, Agent, or Firm* — Scully, Scott, Murphy & Presser, P.C.; Daniel P. Morris

(57) ABSTRACT

Training a neural network according to a training algorithm, which may iteratively perform the following. Scaled connection weight values are called from a memory. Such values span an initial range within or compatible with the limited range of values allowed by hardware. Based on the values called, effective connection weight values are learned. The values learned span an effective range that differs from the initial range. As learning proceeds, the scaled connection weight values are updated by scaling the values learned, so as for the updated values to span a final range that is within the limited range. The training algorithm instructs to store the updated, scaled values on the memory, in view of a next iterative step.

18 Claims, 4 Drawing Sheets

(56) References Cited

OTHER PUBLICATIONS

Bahar, H.B., et al., "Artificial Neural Networks Based Dynamic Weight Estimation with Optical Arrangement", Computer Science & Engineering and Electrical Engineering, Dec. 2010, pp. 189-195, vol. 17, No. 2.

Gokmen, T., et al., "Acceleration of Deep Neural Network Training with Resistive Cross-Point Devices", in: arXiv preprint arXiv:1603. 07341, Submitted on Mar. 23, 2016, 19 pages.

Gupta, S., et al., "Deep Learning with Limited Numerical Precision", In Proceedings of the 32nd International Conference on Machine Learning (ICML '15), Jul. 6-11, 2015, 10 pages, vol. 37.

Withagen, H., "Reducing the effect of quantization by weight scaling", 1994 IEEE World Congress on Computational Intelligence, 1994 IEEE International Conference on Neural Networks, Jun. 28, 1994-Jul. 2, 1994, pp. 2128-2130.

\* cited by examiner

FOILING NEUROMORPHIC HARDWARE LIMITATIONS BY RECIPROCALLY SCALING CONNECTION WEIGHTS AND INPUT VALUES TO NEURONS OF NEURAL NETWORKS

BACKGROUND

The present disclosure relates in general to the field of neural networks and neuromorphic hardware and system implementing such neural networks. In particular, the present disclosure relates to methods for training a neural network, wherein connection weights and related values of the network are scaled to address hardware limitations.

An artificial neural network (ANN) is a computational model inspired by biological neural networks in human or animal brains. Such systems progressively and autonomously learn tasks by means of examples; they have successfully been applied to machine learning (speech recognition, text processing, computer vision, etc.).

An ANN comprises a set of connected units or nodes, which are called artificial neurons and compare to biological neurons in animal brains. Signals can be transmitted along connections (also called edges) between artificial neurons, similarly to synapses. That is, an artificial neuron that receives a signal processes it and then signal connected neurons. In usual implementations, signals conveyed along such connections are real numbers and output of the artificial neurons are computed thanks to a non-linear function $f$ of the sum of its inputs. Typically, connection weights (also referred to as synaptic weights) are associated to the connections and nodes, which adjust as the learning proceeds.

Mathematically speaking, in a computational neural network, sets of inputs x and outputs y (corresponding to pre- and post-synaptic neurons, respectively), are interconnected via connection weights that can typically be represented by a matrix w, where, e.g., y=w x for a linear neuron. I.e., each neuron may have several inputs and a connection weight is attributed to each input (the weight of that specific connection). In operation, when an artificial neuron activates, it computes its state, by adding all incoming inputs multiplied by its respective connection weight. Such connection weights are learned by the training algorithm during a training phase and thereby updated. The learning process is iterative: data cases are presented to the network one at a time, and the weights associated with the input values are adjusted each time. In addition, the network typically comprises bias nodes to provide every computational node with a trainable constant value (in addition to normal inputs the node receives). Connection weights are associated to connections between bias nodes and hidden nodes too.

In other words, a node receives inputs from some other nodes or from an external source and computes an output. Each input has an associated weight, captured in the matrix w, which weight is assigned on the basis of its relative importance to other inputs. The node applies a function $f$ to the weighted sum of its inputs.

Such concepts are illustrated in FIG. 1, which depicts a feedforward neural network (here a multilayer perceptron), which contains multiple neurons arranged in layers. As seen in FIG. 1, nodes from adjacent layers have connections between them, which are associated to weights. The feedforward neural network depicted includes three types of nodes, namely inputs nodes, hidden nodes and output nodes, arranged in respective layers. Input nodes are together referred to as the input layer: they provide information from the outside to the network. Such nodes merely pass on information to the hidden nodes and do normally not perform any computation. Hidden nodes are arranged in one or more hidden layer (only one such layer is assumed here, for simplicity); they are hidden from the outside world inasmuch as they have no direct connection therewith. They perform some computations and thereby transfer information from the input layer to the output nodes. Output nodes collectively foul the output layer; they compute and transfer information from the inner network to the outside.

A feedforward network has only a single input layer and a single output layer; it may have one or more hidden layers, or in fact no hidden layer at all. In such a network, information propagates in only one direction (forward direction), from the input nodes to the output nodes, through the hidden nodes. Such a network is free of cycles or loops and differs, in that respect, from recurrent neural networks, which involve cyclic connections between the nodes.

The multilayer perceptron (MLP) shown in FIG. 1 comprises only one hidden layer, though a MLP may in general comprise many such layers. Contrary to single layer perceptrons (which can only learn linear functions), a multilayer perceptron is also able to learn non-linear functions. Although all connections will normally have weights associated with them, only three specific weights (namely $w_0$, $w_1$ and $w_2$) are explicitly shown in FIG. 1, which are associated to connections (edges) leading to the central node of the hidden layer. In this example, the input layer has three nodes only, this including a bias node (here having a value of 1), and two other nodes that respectively take $x_1$ and $x_2$ as inputs. Without any computation being performed in the input layer, outputs from the three nodes therein are 1, $x_1$ and $x_2$, respectively, which are passed to the hidden layer. The latter also has three nodes, including a bias node (whose output is 1), whereas outputs from the other two nodes depend on both outputs from the input layer and weights associated with incoming connections. For instance, the output calculation for the central node amount to $f$(summation)=$f(w_0 \times 1 + w_1 \times x_1 + w_2 \times x_2)$, where $f$ denotes the activation function. The outputs from the remaining hidden node can similarly be calculated. Outputs from the hidden nodes are then fed to the output nodes.

While FIG. 1 depicts a simple neural network, neural networks can be far more complex in practice. In the recent years, deep neural networks (DNNs) have been shown to be among the most accurate and effective methods in a wide variety of tasks including, but not limited to, classification, natural language processing, and medical diagnoses. One of the largest drawbacks of deep neural networks is the computational power and time required to train a model. For example, commonly used state-of-the-art image classification networks can take days or weeks to train. When temporal information or other complex data forms become involved, this training time can increase even further.

Training a DNN requires optimizing a cost function which is a highly non-convex function of the network weights. I.e., most of the computation performed during training and application of deep networks involves a multiplication of a real-valued weight by a real-valued activation (in the recognition or forward propagation phase of the back-propagation algorithm) or gradient (in the backward propagation phase of the back-propagation algorithm). Due to such computational requirements, it is desired to obtain hardware systems that can improve the training of DNNs.

SUMMARY

According to a first aspect, the present invention may be embodied as a computer-implemented method of training a neural network, which comprises one or more hidden layers of artificial neurons. This neural network is assumed to be implemented by a hardware that allows a given, limited range for connection weight values of artificial neurons of the network. The training is carried out according to a training algorithm, so as to iteratively perform steps as follows. Each iterative step comprises: (i) calling scaled connection weight value from a memory; (ii) learning new scaled connection weight values, by updating the scaled connection weight values called; and (iii) instructing to store the updated values on the memory.

In detail, scaled connection weight values are first called from a memory. Such values span an initial range that is compatible (e.g., within) the limited range of values allowed by the hardware. Then, based on the values called, new (scaled) weight values are learned. As learning proceeds, weight values and input values to each neuron of the hidden layer(s) are reciprocally scaled. That is, input values to said each neuron are inversely scaled, based on an inverse scaling coefficient $1/\alpha$, which is an inverse of a scaling coefficient $\alpha$ according to which the connection weight values as called for said each neuron were scaled. This way, the values output by each neuron remain unaffected by the scaling coefficient $\alpha$. The scaled connection weight values as called for each neuron are updated, so as for the updated values to span a final range that is compatible with said limited range, whereas corresponding unsealed values span an effective range that differs from said final range. Eventually, the training algorithm instructs to store the updated, scaled values on the memory, in view of a next iterative step.

According to another aspect, the invention may be embodied as a computerized hardware system. The system comprises a memory and a hardware designed to implement a neural network comprising one or more hidden layers of neurons, each involving one or more multiplication gates. This hardware allows, by design, only a limited range for connection weight values of artificial neurons of the network, whereby scaled connection weight values are stored on the memory, so as for such values to span a range compatible with said limited range. The hardware is further configured to implement the neural network as a network comprising inverse scaling nodes on input branches of the multiplication gates. Such nodes are adapted to inversely scale input values to each of the neurons, based on an inverse scaling coefficient $1/\alpha$, which is an inverse of a scaling coefficient $\alpha$ according to which the connection weight values as stored on the memory are scaled.

This system shall typically be configured to train the network according to a training algorithm, consistently with the above method, whereby, at each iterative step of the training, scaled connection weight value are called from the memory; new scaled connection weight values are learned by updating the scaled connection weight values called; and the updated values are stored on the memory.

According to yet another aspect, the invention may be embodied as a computer program product for training a neural network, in a similar context as described above. The computer program product comprises a computer readable storage medium having program instructions embodied therewith, wherein the program instructions are executable by one or more processors, to cause to train the network according to the above method.

Computerized hardware systems, methods and computer program products embodying the present invention in several embodiments will now be described, by way of non-limiting examples, and in reference to the accompanying drawings.

BRIEF DESCRIPTION OF SEVERAL VIEWS OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which.

The accompanying drawings show simplified representations of devices, systems, neural networks, flowcharts or parts thereof, as involved in embodiments. Similar or functionally similar elements in the figures have been allocated the same numeral references, unless otherwise indicated.

DETAILED DESCRIPTION OF EMBODIMENTS OF THE INVENTION

The following description is structured as follows. First, general embodiments and high-level variants are described (sect. 1). The next section addresses more specific embodiments, technical implementation details and results obtained with such embodiments (sect. 2).

1. General Embodiments and High-Level Variants

Figure 1:
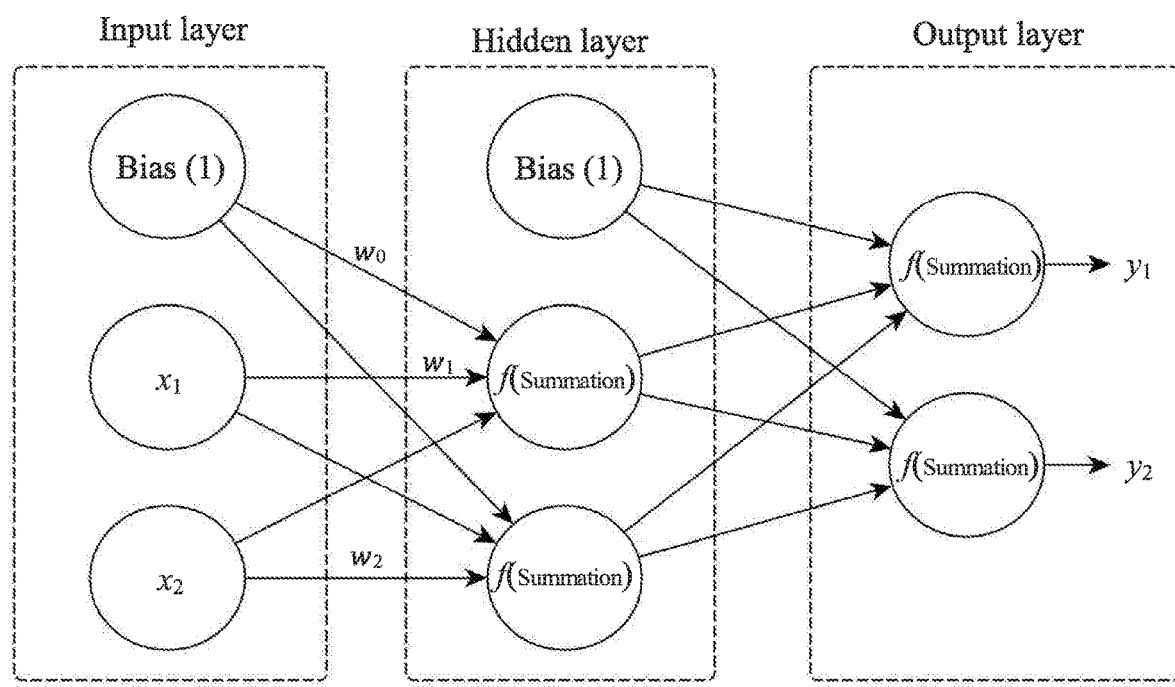
FIG. 1 depicts a simple feed forward network architecture (a multilayer perceptron), according to the prior art.
Figure 3:
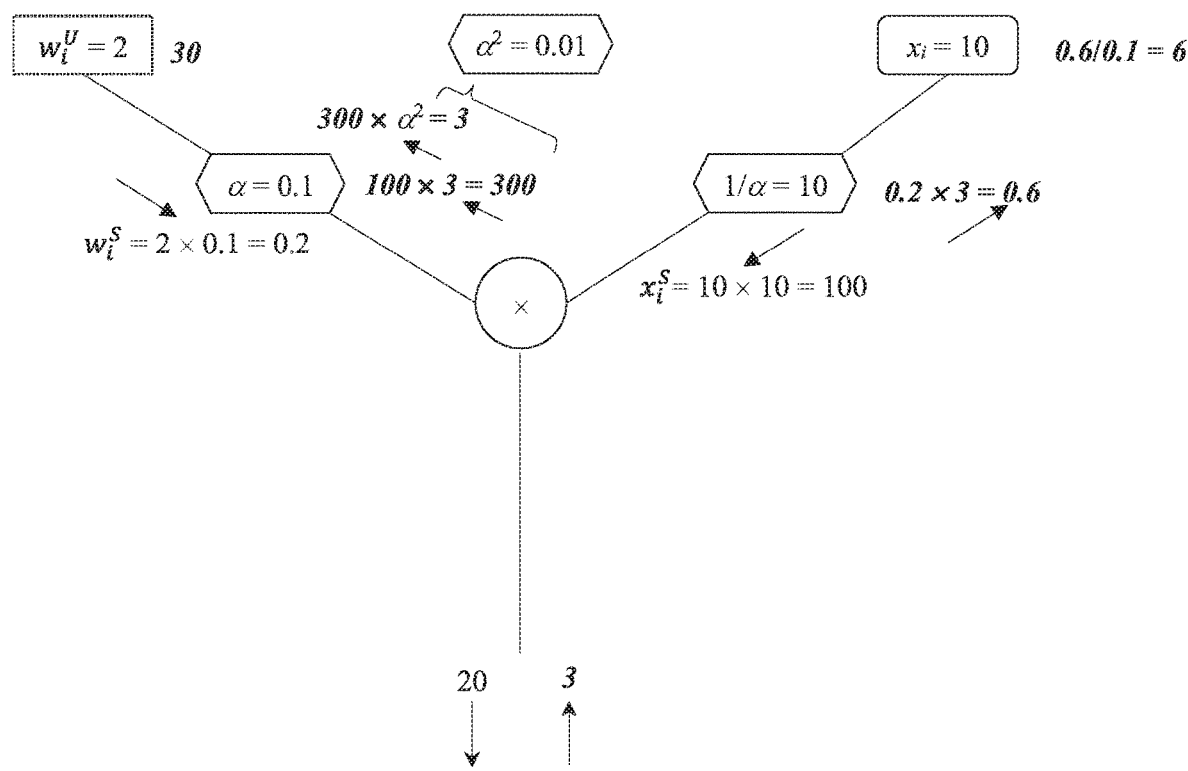
FIG. 3 illustrates scaling operations and how data are accordingly handled about a multiplication gate of a node of a neural network, as in embodiments of the invention.
Figure 4:
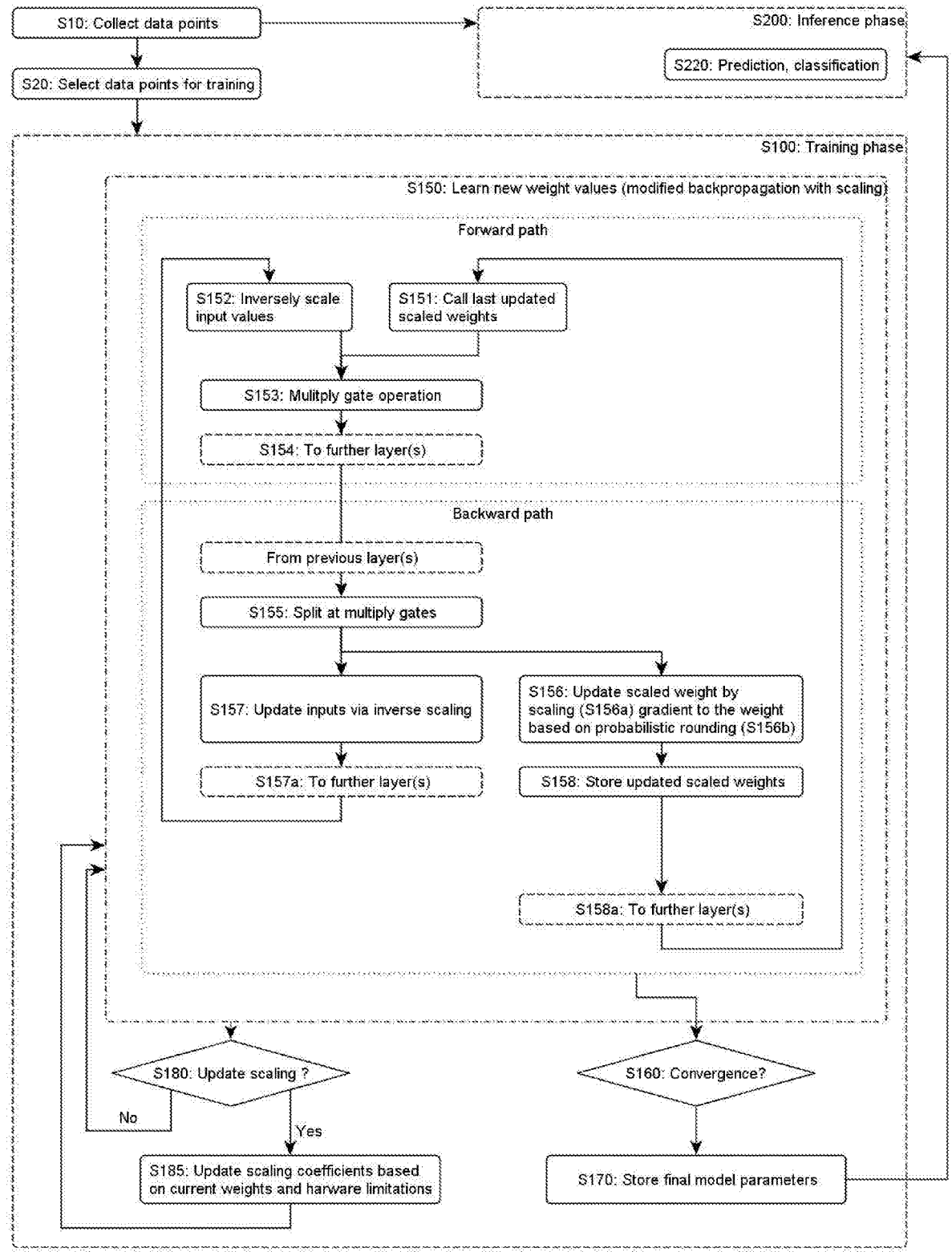
FIG. 4 is a flowchart illustrating selected (high-level) steps of a method for training a neural network, according to embodiments.
Figure 5:
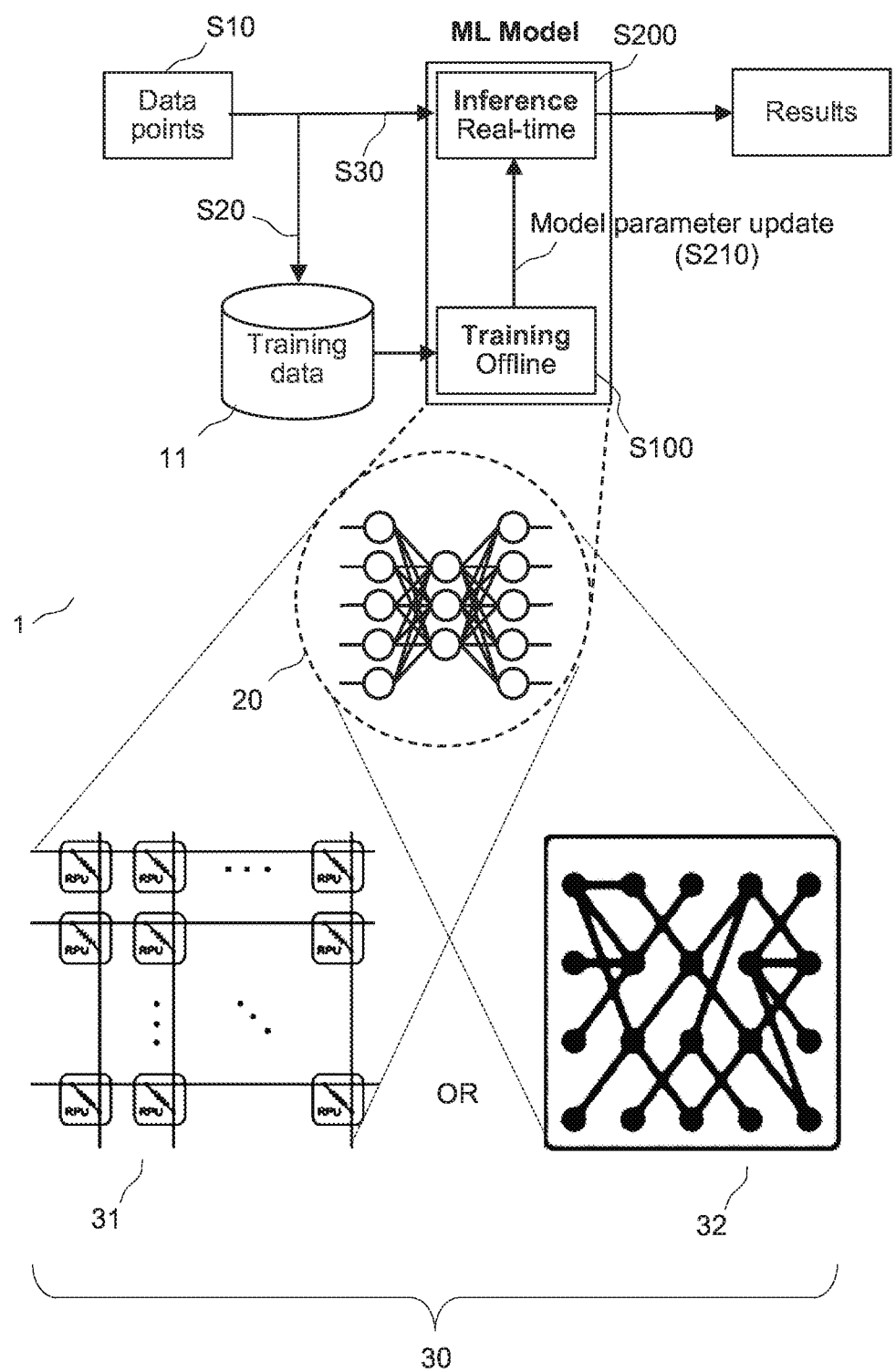
FIG. 5 is a block diagram schematically illustrating selected components of a computerized hardware system designed to implement and train a neural network according to a method such as illustrated in FIG. 4, according to embodiments.

In reference to FIGS. 3-5, an aspect of the invention is first described, which concerns a computer-implemented method of training a neural network 20. The latter comprises artificial neurons, as described in the background section. In particular, this network may comprise one or more hidden layers of artificial neurons, just as the network depicted in FIG. 1. The network 20 is implemented in hardware 30, which may form part of a system 1 as depicted in FIG. 5. This hardware 30 is assumed to have certain limitations. Namely, it allows only a limited range for connection weight values of the neurons, as typical in the art.

The training (generally referred to as step S100 in the flowchart of FIG. 4) is carried out according to a training algorithm, which designed so as for a system 1 implementing the method to iteratively perform a series of steps S150, as indicated in FIG. 4. Note that FIG. 4 only depicts selected steps of a modified backpropagation algorithm, which concern operations pertaining to a single input of a single node of a hidden layer, just like in FIG. 3, for simplicity. Additional steps will typically be carried out, in operation of a real artificial neural network, as the one skilled in the art will appreciate.

At each iteration, the scaled connection weight values need be called S151 from a memory component of the system 1. The scaled values as initially stored on said memory span an initial range that is compatible with the hardware limitations mentioned above. I.e., the scaled values as stored are typically comprised within said limited range or, at most, span a range equal to it. Note that the limited ranges allowed by the hardware (typically for each layer of the network) may be limited in terms of upper bounds and/or lower bounds to the weight values.

Based on the values called, new scaled connection weight values are learned S150 as the training proceeds, whereby the scaled connection weight values get updated S156. The scaled values as updated S156 will span a final range that, again, need be compatible with the limited ranges of values allowed by the hardware. Once the scaled values have been updated, the algorithm instructs to store S158 the updated, scaled values on the memory, in view of a next iterative step S150.

In more detail, the learning S150 proceeds in such a manner that, for each hidden layer and for each neuron of said layer, input values and weight values be reciprocally scaled. That is, input values to said each neuron get inversely scaled S152 with respect to the scaling coefficient $\alpha$ according to which the weight values as called at step S151 (for said each neuron) were scaled and stored on the memory during a previous step S150. That is, such input values are scaled by a coefficient $1/\alpha$, which is the inverse of $\alpha$. This way, the values output by each neuron (upon activation) remain unaffected by the scaling coefficient $\alpha$ used for the weight values.

Scaling the connection weights as proposed herein makes it possible to force the scaled weight values to more suitably fill (i.e., distribute within and span) the range of values allowed by the hardware. On the contrary, the corresponding, unscaled weight values are not necessarily bound to that range. Interestingly, the training algorithm may not even be "aware" of, i.e., may not even have to consider, the corresponding unscaled values. Indeed, in embodiments as discussed below, mutually consistent scaling operations are disclosed, which make it possible for the algorithm to transparently handle scaled values and yet arrive at the same result as if unscaled values had affectively been considered by it (assuming the hardware could tolerate such values). In variants, however, the algorithm may be aware of the unscaled value, even though only the scaled weight values are stored.

The weight values as scaled may possibly span the entire range allowed by the hardware, if this range has both an upper bound and a lower bound. On the other hand, the precision allowed by the hardware 30 may also be an issue, when the weight values reach very small numbers upon training the network, as such numbers can only be set to a given precision. In that case, scaling operations as described herein may further be performed so as to prevent too small numbers to be stored. Instead, the scaling may utilize the weight range available as efficiently as possible, which, in turn, allows the available precision to be optimized, without manually tuning the weight range.

Thus, in the present approach, the value range of the synaptic weights is scaled to allow the weight values as stored and called by the training algorithm to remain within the limited range allowed by the hardware. Now, while the scaled values may be constrained to remain within said limited range of values, the effective weight range of the corresponding unscaled values may change to any range as needed for the learning, which is not necessarily bounded by the limited range allowed by the hardware 30.

The learning process is carried out by updating S156 the scaled connection weight values, which updated values are then stored S158 on the memory, so as to allow a further learning cycle S150, in an iterative manner. Eventually, the parameters learned by the training algorithm, which are stored in a scaled form throughout the learning process, may be unscaled to unveil the true, unscaled weight values, if necessary. Such (unscaled) values can then be used for inference purposes S200, as the hardware constraints that motivated the scaling during the training may no longer be present. Alternatively, a same or similar system 1 as used for training the model parameters is used S200 for inference too, such that the same scaled parameters learned can be used at inference time too. In other variants, the weight values learned may need be rescaled for inference purposes. For instance, in typical application, the weight values as learned may be transferred to a less complex system, which can nevertheless efficiently perform inferences. And this may possibly require to first rescale or fully unscale the weight values learned, in view of transferring them to the inference system.

Reverting to the learning process: various scaling schemes may, in principle, be contemplated. However, the scaling operations S152, S156*a*, S157 are preferably performed according to scaling coefficients defined or a per layer basis. That is, a single scaling coefficient $\alpha$ is used for an entire hidden layer and the same applies to each hidden layer. Thus, for each hidden layer and at each iterative step S150 of the training S100, the scaling operations for that hidden layer are all performed based on a same (unique) coefficient $\alpha$.

As one may realize, because hardware 30 for implementing neural networks typically imposes constraints in terms of coefficients at the layer level (or equivalently per weight matrix level), the scaling coefficients may advantageously be defined and updated on that same level. I.e., a single scaling value $\alpha$ need thus be used (at each iterative step of the training) for each layer of the network.

A hidden layer comprises neurons which are simultaneously processed by the training algorithm. A layer can thus be associated with all the weights of a single weight matrix. For example, if $x_0$ is an input value (a vector), and $y_0$ is an output value (another vector, not necessary of the same length), and $w_0$ is a weight matrix, then we have $y_0 = w_0 x_0$ for a linear neuron. In this case, each row of $w_0$ represents synaptic weights of a single neuron (the number of rows in $w_0$ is equal to the number of neurons in that layer). The output $y_0$ may then be passed through a non-linear function $f$ (also called activation function) and the result will then be used as the input to the next layer of the network, i.e., $y_1 = w_1 f(y_0)$.

Thus, in embodiments, each weight matrix $w_n$ may be updated according to a respective scaling value $\alpha_n$, so as to best reflect constraints the hardware 30 may have on a per layer/per weight matrix level. For example, in some optical hardware, the mean value of the weight matrix may be constrained such that it cannot exceed a certain limit, as discussed below. Of course, bias values may similarly be scaled, so as to match hardware limitations.

Then, beside the scaling of the weight matrices $w_n$, the training algorithm causes to inversely scale S152 input values to each neuron (of a same hidden layer) based on a same (single) inverse scaling coefficient $1/\alpha$, as illustrated in FIG. 3. Such an inverse scaling is performed at each iterative step S150 of the training and for each neuron of a same hidden layer. Similar scaling operations will normally be performed for all the hidden layers of the network 20. As explained in the background section, input values respectively correspond to connections (edges) to neurons of a same hidden layer. These input values can thus be respectively associated with scaled weights as called for neurons of a same hidden layer and a single inverse scaling coefficient $1/\alpha$ will be used to scale input values to neurons of that same hidden layer, where $1/\alpha$ is the inverse of $\alpha$, which is the coefficient used to scale the corresponding connection weight values. Note, however, the scaling of weight values may be implicit (the weight values can be assumed to be already scaled), inasmuch as the scaled weight values only need be updated, without it being necessary to explicitly scale such values. It remains that input values and weight values are reciprocally scaled. As a result of this reciprocal scaling, values output by the neurons on the forward path remain unaffected by the scaling operations. Thus, the network can be trained exactly as if no scaling were performed, while the hardware limitations in terms of weight values can be foiled, thanks to the weight scaling.

In practice, matrix operations such as $y=w \times x$ may be performed, where w and x are inversely scaled, with respect to each other, such that values y output by the neuron remain unaffected. That w and x are "inversely scaled" means that x is scaled by the inverse of what w is scaled by (and vice versa). I.e., they are both scaled by some value, whereby w is scaled and x is inversely scaled. This can be achieved thanks to multiplication gates such as depicted in FIG. 3, whose input branches include additional scaling nodes (depicted as hexagons in FIG. 3). Note that the input values too are unaffected, inasmuch as they can still be fed and updated, unaltered, to the training algorithm. That is, input values are internally changed by the training algorithm. I.e., inputs x get inversely scaled internally, thanks to the inserted scaling nodes ($1/\alpha$).

The network implementation depicted in FIG. 3 amounts to first scale inputs $x_0$ to obtain scaled inputs x and then perform S153 an operation w x (on the forward path), thanks to the scaling node and the multiplication gate, respectively. The inserted scaling nodes do not require other modifications to the network's structure. In variants, more sophisticated implementations can be contemplated to perform such operations, e.g., to add functionality to the existing gates of the network.

Preferably, the training algorithm further causes to scale S156a gradients to the weight, as illustrated in FIG. 3. This can again be achieved by way of a dedicated node, depicted as a hexagon in FIG. 3. Note, this node should be considered to be on a separate path (back to the scaled weight) as it is not used on the forward pass of the network, only the backward pass. And again, such a scaling is more preferably using a same coefficient $\alpha^2$ for an entire hidden layer. That is, the same coefficient $\alpha^2$ as used for each hidden layer is equal to the square of the single coefficient $\alpha$ used to scale weights of that same hidden layer. This additional scaling operation is performed so as to update S156 the scaled weights on the backward path. This is done as part of a modified backpropagation algorithm, whose main purpose remains to compute derivatives to find how the scaled weights should be updated for a next training step S150. Again, this additional scaling operation is performed at each iterative step. Similar $\alpha^2$ scaling operations will normally be performed for all hidden layers, though typically based on distinct $\alpha$'s for each layer.

Scaling S156a the gradients with $\alpha^2$ allows the weights to be effectively scaled in the hardware 30, in a manner which, together with the scaling and inverse scaling operations evoked earlier, makes the network fully train as though the weights were unscaled, without it being needed to store any additional values. This is now discussed in more detail, in reference to the examples of FIGS. 2 and 3. There, the normal (non-italic, non-bold) numbers refer to data obtained during the forward pass through the network. Numbers in bold italic pertain to outcomes of the backpropagated gradients. The operations shown reflect the three types of scaling operations discussed above, and their consequences on the backpropagation.

Figure 2:
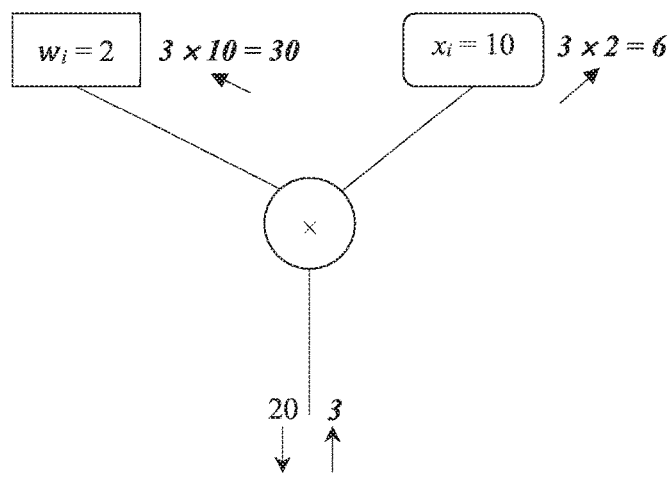
FIG. 2 illustrates how data are handled at a multiplication gate of a node of such a network, according to training methods known in the prior art.

How a typical neural network would multiply a single weight by a single input value and then handle the backpropagation is shown in FIG. 2. Starting from the top, the normal (non-italic, non-bold) numbers reflect the forward step: the weight and input values are multiplied at the multiplication gate, which results in 2×10=20 in output. The rest of the network proceeds with this value (not shown). Next, the backpropagation starts with some calculated gradient value (coming from the output side of the network), which is here assumed to be equal to 3. As the derivative is computed, the value 3 is split at the multiplication gate such that each branch receives 3× (the other branch input). The weight accordingly receives a gradient of 3×10=30 and the input branch passes back (i.e., further into the network) a gradient of 3×2=6.

At present, assume we effectively want to obtain the same results by training a network provided with scaling operations ($\alpha$, $1/\alpha$ and $\alpha^2$) as described above, keeping in mind the constraints in terms of weight values imposed by the hardware 30 that implements the network. Assume, for example, that we wish for the scaled weight value to be stored in the hardware to be 0.2 instead of 2, due to such constraints. To achieve this, the weight of value 2 may have been scaled and accordingly stored using $\alpha=0.1$, as illustrated in FIG. 3, it being reminded that this scaling may be implicit. Meanwhile, the input value is scaled S152 by 1/a. This reciprocal scaling nicely leads to the same value of 20 on the forward path, just as before (FIG. 3, lower part). The rest of the network proceeds S154 with this value (not shown in FIG. 3). Next, on the backward path, the situation is similar to that of FIG. 2, except we now have to deal with the fact that only scaled versions of the weights may be available. While we would need the value of 30 being passed to the weight at 2, no such weight value is actually available to the system 1, since the weight value as stored is the scaled version (0.2). Also, the gradient at that point in the network is now 3×100=300, since the value of 100 had resulted from the 1/a scaling at step S152. To get an update value that effectively correspond to the ideal value of 30 being applied to a weight of 2, we need an update of 3 applied to the weight of 0.2, which is simply obtained by scaling S156a the current gradient (300) by $\alpha^2$, as seen in FIG. 3. Then, the scaled gradients can then be propagated S157a, S158a further into the network, on the backward path.

With this, and as far as an otherwise normal training algorithm is concerned, everything is trained exactly as it did in the normal network of FIG. 2. However, the values actually updated and stored on the hardware are here scaled to ranges of interest, i.e., to match constraints imposed by the hardware 30.

As the one skilled in the art may appreciate, variants to the above scaling operations can be contemplated, which effectively allow the same goal to be achieved. First, the example set of scaling coefficients given above (namely $\alpha$, $\alpha^{-1}$ and $\alpha^2$) forms a mutually consistent set, which allows the network to update weights transparently and, this, notwithstanding the fact that only the scaled coefficients are stored on the memory and are thus available to the training algorithm. Still, other mutually consistent sets of scaling coefficients could be devised, which may possibly act in different places of the network to achieve the same goal. For example, the unsealed weight values maybe stored in hardware rather than the scaled weight values, and the scaled values would then be computed during inference. Depending on the circumstances of hardware, there may be cases where this configuration would be desirable. In this case, the $\alpha^2$ scaling is unneeded because backpropagation through the $\alpha$ gate would produce the correct gradient value to the unsealed weight (i.e., 30 instead of 3 in FIG. 3). The configuration requiring the $\alpha^2$ scaling is likely to be necessary for many hardware circumstances, but other configurations such as the one above may be applicable in other cases.

Next, the training algorithm will preferably be configured so as to automatically update S180, S185 the basis scaling coefficients $\alpha$, so as to accordingly update the coefficients $\alpha^{-1}$ and $\alpha^2$ used to scale the input values and gradients. Now, and as one may realize, each scaling coefficient $\alpha$ (e.g., as pertaining to each respective hidden layer) can be automatically updated, based on the unsealed connection weight values corresponding to the current values of the scaled connection weights. Since the unsealed weight values are preferably not stored (and thus are not immediately available), the unsealed values need first be determined based on the scaled weights and the old scaling coefficient $\alpha$, then the unsealed values obtained are used to compute the updated value of $\alpha$. Note, however, that this update process need not systematically be performed at each iterative step of the training (though it may be, in variants), for reasons explained latter.

For instance, the scaling coefficient $\alpha$ pertaining to each hidden layer may automatically be updated S180, S185 according to a limit l imposed by the limited range available for the connection weight values as stored for that layer, and a standard deviation a of the corresponding values of the unsealed connection weights. I.e., $\sigma$ is the standard deviation of the unsealed weights of the entire layer of neurons. In variants, any meaningful measure of the statistical dispersion of the weight values may be used in place of the standard deviation.

A particularly simple approach is to update each coefficient $\alpha$ by assigning to it a value equal to $l_{per}/(\beta\sigma)$, e.g., upon completing some iteration step or an epoch. In this formula, $l_{per}$ represents a maximum value for any connection weight in the layer concerned, due to said hardware limitations, and $\beta$ is a constant. Optimal values for this constant may for instance be determined by trial-and-error. In practice, such values will typically be between 1 and 2. For instance, a value of $\beta=1.5$ happened to nicely work in experiments performed by the inventor. Using the above formula, a simple update scheme is achieved, which is for instance well suited when using a resistive processing unit 31 to implement the neural network 20, as weight limits are typically based on maximum weight values in that case.

As said earlier, the scaling operations will preferably be performed so as to take advantage of the available weight range, e.g., by keeping the weight values within the range allowed and using as much of this range. At the same time, care can be taken to minimize losses from the limited precision available.

For example, assume one has three weights, whose corresponding unsealed values are $\{1, 1, 100\}$, and is limited by a maximum weight value for each individual weight value, which maximum is given by $l_{per}$.

Consider a first case where $l_{per}=50$ and the precision of the network is 0.5. Having a network precision of 0.5 means that any weight cannot be accurately set to a desired value of intervals of less than 0.5 (i.e., changing a weight value from 0.5 to a desired 0.7 would thus result in a weight of 0.5). In this case, the algorithm may compute S185 a value $l_{per}/(\beta\sigma)=50/(1.5\times46.7)\approx0.71$, where $\sigma\approx46.7$ is the (non-unbiased) standard deviation of the unsealed weight values given above, and then assign S185 this value to $\alpha$. From this, the resealed weights are computed as $\alpha\times(1, 1, 100)\approx(0.71, 0.71, 71)$. Finally, the weights need be clipped according to $l_{per}$, and set by the allowable precision due to the mentioned hardware limitations, hence yielding a scaled (0.5, 0.5, 50), which corresponds to an unsealed (0.7, 0.7, 70), before being stored on the memory.

Notice, the relative values are closer to what they used to be than they would be had we simply clipped immediately (1, 1, 50). This still may seem like a pretty drastic change, but in the iterative training process S100 such an extreme version of clipping will rarely be encountered in practice. In addition we note that considering the unbiased standard deviation instead of the non-unbiased deviation has little importance in practice, since even if the entire population of weights are not used to calculate the standard deviation, the sample size will still be very large and because the scaling equation can be adapted to either choice.

As another example, assume that $l_{per}=500$ and that the precision of the network is now 5 (e.g., changing a weight value from 50 to a desired 53 would result in a weight of 55), whereas the unscaled values of the three weights considered remain unchanged (1, 1, 100). Some weight updates may still fall below this level. Yet, using the present scaling approach, a larger number of weight updates will normally be kept above this level, compared to the number of weight updates that would without using this scaling. In this other example, the algorithm will compute S185 a value $l_{per}/(\beta\sigma)=500/(1.5\times46.7)\approx7.14$. After scaling, clipping, and setting the weight values by the allowable precision, a scaled (5, 5, 500) is obtained, which corresponds to an unsealed (0.7, 0.7, 70). In this additional example, unsealed weight values that would have been below the precision level are brought above it, thanks to the scaling and clipping.

Note, there is some loss from clipping very high values, but the gains from bringing the other values above the precision threshold can be shown experimentally to be very beneficial overall. In the same regard, the above scheme does not make sure that all values will be brought above the precision threshold. The constant $\beta$ determines how much to value one option over the other. A larger $\beta$ leads to less clipping and more under precision, while a smaller $\beta$ leads to the opposite. Also, depending on the distribution of the actual values, there might not be any clipping or under precision at all.

Note that, in the above examples, the weight values are explicitly resealed (on updating $\alpha$). This, however, differ from the update step S156, where the weight values do not necessarily need be scaled, explicitly.

In variants to the above scaling (based on $l_{per}/(\beta\sigma) \to \alpha$) and clipping, the coefficient $\alpha$ may be automatically updated S180, S185 by computing a value equal to $$\frac{Nl_{mean}}{\sum_{i=0}^{N}|w_{i_c}|}$$

and assigning the result to the scaling coefficient $\alpha$; in the above formula, $l_{mean}$ denotes a mean absolute weight limit imposed by the limited range available for the connection weight values (for a given hidden layer), N is the number of connection weight values in this layer, and $w_{t_c}$ is the ith weight value of this layer, clipped to an interval of values ranging now from $-\beta\sigma$ to $\beta\sigma$. This variant is discussed in more detail in sect. 2.

As noted earlier, the scaling coefficient α need not automatically be updated S185 at each iterative step S150. Rather, it may be updated at given intervals of such iterative steps S150 or, even, at every epoch of the training S100, for the sake of execution speed.

Another potential issue to be dealt with some hardware specifications is the quantization of values they require. For example, the weights of the neural network will not be stored with infinite precision. To address this issue, the scaled connection weight values as called at step S151 are preferably updated S156 according to a probabilistic rounding scheme (also called stochastic rounding scheme). That is, any updated weight value is rounded S156b to a multiple value of a given resolution E based on a probability function $p(\cdot)$.

The same probabilistic rounding scheme can in fact be used to update any needed value. For example, the probabilistic rounding scheme may be such as to round a value $round_p(x,\epsilon)$ of a value of x according to:

$$round_p(x, \in) = \begin{cases} p(\lfloor x \rfloor_\in) = 1 - \frac{x - \lfloor x \rfloor_\in}{\in} \\ p(\lfloor x \rfloor_\in + \in) = \frac{x - \lfloor x \rfloor_\in}{\in} \end{cases},$$

where $\lfloor x \rfloor_\in = \{\max_n n \in | n \in < x, n \in \mathbb{Z}\}$.

Using such a rounding scheme, even a weight with a very small update relative to the precision available has a chance of being updated to a new value. This point is developed in sect. 2.

As evoked earlier, the neural network 20 may notably be implemented by an optical neuromorphic system 32 or by a resistive processing unit 31, as depictions used in FIG. 5 suggest. Typically, the neural network 20 is itself a feedforward neural network 20, such as a multilayer perceptron (as in FIG. 1). Yet, in variants, the network 20 may be more involved, e.g., be a deep neural network or a convolutional neural network.

Referring altogether to FIGS. 3 and 5, another aspect of the invention is now discussed, which concerns a computerized hardware system 1. Such a system basically comprises a memory (not shown, for notably storing weights values as well as other model parameters) and a hardware designed to implement the neural network 20. As explained earlier, the network may comprise one or more hidden layers of neurons, each involving one or more multiplication gates. All the more, the implementing hardware 30 allows, by design, only a limited range for connection weight values of artificial neurons of the network 20. Thus, scaled connection weight values are stored on the memory, so as for such values to span a range compatible with said limited range, as described earlier.

The system may involve different types of memory, including a main memory dedicated to the operation of the network 20. One may for instance want to store the scaled connection weight values in an active matrix (electrical, optical, etc.). The optical/electrical matrix would normally be the place the weights are stored during training. In addition, or in variants, the weight values may, upon being called, be moved around between different memories, e.g., in order to perform in-memory computations.

As previously discussed in reference to FIG. 3, the hardware 30 may further be configured to implement a modified neural network 20. I.e., this network comprises inverse scaling nodes on input branches of the multiplication gates, which nodes are adapted to inversely scale input values to each of the neurons (on the forward path), based on inverse scaling coefficients $1/\alpha$. In addition, the hardware 30 shall preferably implement a network 20 that further comprises square scaling nodes on other input branches of the multiplication gates, so as to scale gradients to the weight with a coefficient $\alpha^2$, as explained earlier. As the one skilled in the art, there are several possibilities to achieve this, e.g., depending on the hardware being used for the main matrix multiplication.

The system 1 may otherwise be configured to train the network 20 according to any of the methods discussed earlier in reference to FIGS. 3 and 4, whereby, at each iterative step S150 of the training, scaled connection weight values are called from the memory, new scaled connection weight values are learned by updating the weight values called and the updated values are stored on the memory.

FIG. 5 depicts such a system 1, which, once properly trained, may further be configured to perform S200 inferences, as otherwise reflected in the flowchart of FIG. 4. In a possible scenario, data points are first collected S10, e.g., in real-time, in view of some application of interest. Some of the data points may be selected S20 for training purposes, and accordingly stored on a data repository 11, e.g., on any suitable memory or storage component of the system 1.

For example, selected data S20 can be used to train S100 the network 20 offline, whereas inferences may possibly be performed S200 in real-time. Upon completion of a training cycle, updated model parameters are passed to a neural network used for inference purposes S200 (which may be similar or identical to the network 20 used for training), while the model may be re-trained in parallel at the network 20, based on newer training data. The trained model may for instance be used S220 for prediction or classification, depending on the application sought. Results accordingly obtained are finally stored. In variants, the network is trained and, upon completion of the training, it is deployed for inference, without being trained again.

According to yet another aspect, the invention can be embodied as a computer program product for training a neural network, in a similar context as described above. The computer program product comprises a computer readable storage medium having program instructions embodied therewith, wherein the program instructions are executable by one or more processors, e.g., of a system 1 such as depicted in FIG. 5, to cause to train the network according to the methods discussed earlier. Still, it will be appreciated that at least some of the steps of the present methods will be implemented in hardware 30 or directly involve such hardware 30. Remaining steps or functions may, however, involve a higher-level programming language, e.g., meant to run the system 1 and thereby allow the training S100 of the network 20.

A computer-implemented method of training a neural network is disclosed as described above. In some embodiments, this neural network is assumed to be implemented in a hardware that allows a given, limited range for connection weight values for artificial neurons of the network. The training is carried out according to a training algorithm, so as to iteratively perform steps as follows. Scaled connection weight values are called from a memory. Such values span an initial range within (i.e., compatible with) the limited range of values allowed by the hardware. Based on the values called, effective connection weight values are learned. The values learned span an effective range that differs from said initial range. As learning proceeds, the scaled connection weight values are updated by scaling the values learned, so as for the updated values to span a final range that is within said limited range. Eventually, the training algorithm instructs to store the updated, scaled values on the memory, in view of a next iterative step. Hardware systems and computer program products of training a neural network are also disclosed.

The present invention may thus be embodied as a computerized hardware system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

2. Specific Embodiments—Technical Implementation Details

Methods discussed herein provide ways to improve the training of a neural network given several limitations, including those discussed in [1]. Experiments conducted by the Inventor were notably focused on the specifications of an optical neuromorphic system. Yet, most of these experiments and improved training approaches as proposed herein are also applicable to other types of neural networks, starting with resistive processing units (RPUs) as described in [1].

Most of such experiments take advantage of a probabilistic rounding algorithm as proposed in [2]. The Inventor has found significant improvements in using it along with the weight scaling algorithm proposed herein. Now, while the focus on [2] is in using such a probabilistic rounding when considering the full precision of the network values, the effects of such a probabilistic rounding scheme are here explored in individual areas of the hardware specifications. For example, input values, output values, and weight values may individually be quantized as they have, each, a different specification in the real world hardware. Note, [2] refers to this rounding as a "stochastic rounding". Yet, in order to avoid confusion with the tie-breaking form of rounding of the same name, use is here made of the term "probabilistic rounding".

2.1 Methodology
2.1.1 Probabilistic Rounding

Many of the hardware specifications dealt with in the present document involve the quantization of a value. For example, the weights of a neural network do not have infinite precision. This precision can be quite low relative to those commonly used for training a neural network. Often, the weight update may be much smaller than this precision. Thus, using a standard rounding scheme may possibly result in the network failing to train as weights may never change (or at least not frequently enough). On the contrary, a probabilistic rounding scheme as described by [2] allows the network to train even with more restrictive precision. Specifically, using such a scheme, even a weight with a very small desired update relative to the precision has a chance of being updated to a new value.

Formally, if x is the value we wish to round and $\epsilon$ the resolution we wish to round the value to, we may define:

$$\lfloor x \rfloor_\epsilon := \{\max_n n \in \epsilon \mid n \in  < x, n \in \mathbb{Z}\}$$

While the standard rounding scheme is given by $$\text{round}(x, \epsilon) = \begin{cases} \lfloor x \rfloor_\epsilon & \text{if } \lfloor x \rfloor_\epsilon \leq x \leq \lfloor x \rfloor_\epsilon + \epsilon/2 \\ \lfloor x \rfloor_\epsilon + \epsilon & \text{if } \lfloor x \rfloor_\epsilon + \epsilon/2 < x \leq \lfloor x \rfloor_\epsilon + \epsilon \end{cases}$$

a possible probabilistic rounding scheme is $$\text{round}_p(x, \epsilon) = \begin{cases} p(\lfloor x \rfloor_\epsilon) = 1 - \dfrac{x - \lfloor x \rfloor_\epsilon}{\epsilon} \\ p(\lfloor x \rfloor_\epsilon + \epsilon) = \dfrac{x - \lfloor x \rfloor_\epsilon}{\epsilon} \end{cases} \quad (2)$$

It should be noted that such a probabilistic rounding can lead to training instability for very low-level precision. This can occur because a weight can change by a very large amount relative to the desired update, which can lead to an exploding gradient problem. To mitigate this a lower learning rate or a truncated probabilistic rounding can be used. In addition, and as the one skilled in the art may appreciate, other definitions of the underlying probability p(·) may be adopted, which make it possible for small desired updates to be possibly accepted.

2.1.2 Adaptive Weight Scaling

The weights of a network are bound to a range by the physical properties of the hardware. Previous work has modeled this limitation separately from the problem of weight precision in hardware [1]. For example, when trained without weight range limitations, the weights of a multilayer perceptron network as considered by the Inventor happens to distribute approximately normally with a standard deviation of 0.097. However, the three layers involved in this example have an individual weight standard deviation of 0.093, 0.107, and 0.289.

This variation between layers shows that the same weight range limitation will have a different effect depending on which layer it is applied to. Additionally, assuming unlimited precision, a weight range limitation will not affect the training of the network unless that limit is less than the max weight value which occurs during training without the limitation. In practice, as we are able to apply gains to the output of the hardware, we can effectively select the weight range limitation to be arbitrarily large. However, these gains of course lower the precision of the weights.

We now present particular embodiments of the methods discussed in sect. 1, which make it possible to efficiently train the weights, for them to fill the entire weight range available and best use the given precision without manually tuning of the weight range. Such methods cause no change in the training process as the values input and output by each synapse remains the same as they would have been without this adaptive scaling scheme. During the training, the weight value w are assumed to be scaled by some value $\alpha$. For the synapse to output the same value as it would have without the weight being scaled, the input value x is reciprocally scaled by $1/\alpha$. As the output of the synapse is unchanged by this procedure, during backpropagation the gradient into the synapse remains unchanged. With L being the error computed by the output neuron, the gradient to the weight, $$\frac{\delta L}{\delta w},$$

is then $$\frac{\alpha L x}{\alpha} = Lx,$$

and the gradient to the input, $$\frac{\delta L}{\delta x}, \text{ is } \frac{\alpha Lw}{\alpha} = Lw.$$

This results in the training process being unchanged, but the weights being used during the matrix multiplication have been scaled.

To allow this to be usefully implemented in hardware, we can assume the weights are already scaled and we can instead multiply only the inputs by $1/\alpha$. Then, we update the backpropagation algorithm to multiply gradients to the weight by $\alpha^{-2}$. With this we again obtain the same training process, but now only need to store the scaled version of the weights. By selecting the appropriate scalar, we can force the weights to fill the entire weight range of the hardware and therefore take advantage of the entire precision available.

Next, to make this scalar selection automatic during training, we further propose updating it based on the current weights. The scalar may for instance be set as $$\alpha = \frac{l_{per}}{\beta \sigma}, \quad (3)$$

where $l_{per}$ is the per weight limit, u is the standard deviation of the unsealed weights, and $\beta$ is some constant. We notably used $\beta=1.5$ in our experiments. Note that the weights are still clipped after this resealing. Any weight clipping takes into account quantization (e.g., when experimenting with a weight update quantization, the clipped weights are restricted to be clipped to a weight which is allowed by the update quantization).

In the cases where our weight range is limited by the mean absolute weight value, we first clip the values to $\beta\sigma$, then we set the scalar as $$\alpha = \frac{N l_{mean}}{\sum_{i=0}^{N} |w_{i_c}|}, \quad (4)$$

where $l_{mean}$ is the mean absolute weight limit, N is the number of weights, and $w_{i_c}$ is the ith weight value after the clipping. Note that after this resealing weight clipping is not required again as the weights already conform to the limit. This approach allows the training process to automatically adjust the weight ranges in hardware as necessary. When trained in this way, changing the weight range and corresponding precision has no impact on training.

In either of the above cases, information about the weights need be gathered to make the update. Reading out the weights may or may not be a relatively expensive operation depending on the hardware. Fortunately, this scaling is not required to occur at every step. It can for instance be updated on much slower intervals (e.g., every 1000 steps, for every epoch, etc.) and still result in the weights using the full weight range of the hardware.

2.2 Results

The present inventor has performed a number of simulations, mainly based on two types of networks. First, a multilayer perception (MLP) was considered, which has 784 (28×28) inputs and 3 fully connected layers with 256, 128, and 10 units respectively. Such an MLP has ~235,000 parameters. Second, a convolutional neural network (CNN) was further considered, which has a 28×28 input using a stride 2 max pooling 2 layer, 3 5×5 kernel convolutional layers without padding with 4, 8, and 16 units, and finally a fully connected layer with 10 units. This CNN has ~67,000 parameters.

In the simulations performed, imperfections caused by the hardware (e.g., read error) were not taken into account by the backpropagation algorithm. That is, normally during backpropagation the path of the gradient back to the weight has full information of each operation which acted on it, but in the simulation, several components are unknown to the backpropagation. I.e., the algorithm works without this information.

First, improvements were observed, which are due to the use of the probabilistic rounding. Similarly to the weight precision, the probabilistic rounding results in significant improvements to accuracy for a given input precision.

All the more, such simulations have shown that the above adaptive weight scaling scheme allows for a network to train to convergence with significantly reduced precision. Specifically, in the case of the MLP on the MNIST dataset, the test error is only at 2.73% with only 21 levels. And it remains below 10% even with only 9 levels.

More generally, the present inventor has explored which hardware limitation thresholds prevent a neural network from converging during training and has further have shown that software adjustments allow the network to converge with stricter hardware limitations. He has therefore proposed methods to automatically scale weights to utilize the entire weight range available, and shown how this can improve network performance, particular in cases with limited precision.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A computer-implemented method of training a neural network implemented in a hardware that allows only a limited range for connection weight values of artificial neurons of the network, the latter comprising one or more hidden layers of neurons, wherein the training is carried out according to a training algorithm, so as to iteratively perform steps that comprise, each:

calling scaled connection weight values from a memory, which values span an initial range compatible with said limited range;

based on the scaled connection weight values called, learning new scaled connection weight values, whereby, for each layer of said one or more hidden layers and for each neuron of said each layer:
input values to said each neuron are inversely scaled, based on an inverse scaling coefficient $1/\alpha$, which is an inverse of a scaling coefficient $\alpha$ according to which the connection weight values as called for said each neuron are scaled, so as for values output by said each neuron to remain unaffected by this scaling coefficient $\alpha$, and
the scaled connection weight values as called for said each neuron are updated, so as for the updated values to span a final range compatible with said limited range, whereas corresponding unsealed values span an effective range that differs from said final range; and
instructing to store the updated, scaled connection weight values on the memory.

2. The method according to claim 1, wherein:
learning the new scaled connection weight values further comprises, for said each neuron and for each scaled connection weight values pertaining to said each neuron, to scale a gradient to the weight with a square scaling coefficient $\alpha^2$ that is equal to a square of said scaling coefficient $\alpha$, so as to update said each scaled connection weight values.

3. The method according to claim 2, wherein
the new scaled connection weight values are learned in such a manner that, for each layer of said one or more hidden layers and for every neuron of said each layer:
the input values to said every neuron are inversely scaled based on a same inverse scaling coefficient $1/\alpha$, which is an inverse of a same scaling coefficient $\alpha$ according to which the connection weight values as called for said each layer are scaled; and
gradients to the weight pertaining to said each layer are scaled with a same square scaling coefficient $\alpha^2$ that is equal to a square of said same scaling coefficient $\alpha$.

4. The method according to claim 3, wherein
the training algorithm further causes, for said each layer, to automatically update the scaling coefficient $\alpha$ based on current values of the scaled connection weights of said each layer.

5. The method according to claim 4, wherein
said scaling coefficient $\alpha$ is automatically updated according to a limit/imposed by said limited range for the connection weight values of said each layer and a standard deviation $\sigma$ of said current values.

6. The method according to claim 5, wherein
said scaling coefficient $\alpha$ is automatically updated by assigning a value equal to $l_{per}/(\beta\sigma)$ to the scaling coefficient $\alpha$, where $l_{per}$ is a maximum value for any connection weight of said each layer, as imposed by said limited range, and $\beta$ is a constant.

7. The method according to claim 6, wherein the method further comprises, after automatically updating said scaling coefficient $\alpha$, updating scaled connection weight values of said each layer by scaling corresponding unsealed values and clipping resulting values according to said maximum value $l_{per}$.

8. The method according to claim 5, wherein
said scaling coefficient $\alpha$ is automatically updated by assigning a value equal to $$\frac{Nl_{mean}}{\sum_{i=0}^{N}|w_{i_c}|}$$

to the scaling coefficient $\alpha$, where:
$l_{mean}$ is a mean absolute weight limit imposed by said limited range for the connection weight values of neurons of said each layer,
N is a number of connection weight values in said each layer, and
$w_{i_c}$ is an ith weight value of said each layer, clipped to an interval of values ranging from $-\beta\sigma$ to $\beta\sigma$.

9. The method according to claim 4, wherein
said scaling coefficient $\alpha$ is automatically updated at one of:
intervals of iterative steps of the training; and
at every epoch of the training.

10. The method according to claim 1, wherein
the scaled connection weight values as called for said each neuron are updated according to a probabilistic rounding scheme, or stochastic rounding scheme, whereby any updated weight value is rounded to a multiple value of a given resolution $\epsilon$ based on a probability function $p(\cdot)$.

11. The method according to claim 10, wherein
said probabilistic rounding scheme is such as to round a value $\text{round}_p(x,\epsilon)$ of a value of x according to:

$$\text{round}_p(x, \epsilon) = \begin{cases} p(\lfloor x \rfloor_\epsilon) = 1 - \frac{x - \lfloor x \rfloor_\epsilon}{\epsilon} \\ p(\lfloor x \rfloor_\epsilon + \epsilon) = \frac{x - \lfloor x \rfloor_\epsilon}{\epsilon} \end{cases},$$

where $\lfloor x \rfloor_\epsilon = \{\max_n n \in | n \in < x, n \in \mathbb{Z}\}$.

12. The method according to claim 1, wherein
the neural network is implemented by an optical neuromorphic system.

13. The method according to claim 1, wherein
the neural network is implemented by a resistive processing unit.

14. The method according to claim 1, wherein
the neural network is a feedforward neural network, such as a multilayer perceptron, a deep neural network, or a convolutional neural network.

15. A computerized hardware system, comprising:
a memory; and
a hardware designed to implement a neural network comprising one or more hidden layers of neurons, each involving one or more multiplication gates, wherein the hardware allows, by design, only a limited range for connection weight values of artificial neurons of the network, whereby scaled connection weight values are stored on the memory, so as for such values to span a range compatible with said limited range, wherein
the hardware is further configured to implement the neural network as a network comprising inverse scaling nodes on input branches of the multiplication gates, the inverse scaling nodes adapted to inversely scale input values to each of the neurons, based on an inverse scaling coefficient $1/\alpha$, which is an inverse of a scaling coefficient $\alpha$ according to which the connection weight values as stored on the memory are scaled.

16. The computerized hardware system according to claim 15, wherein the hardware is further configured to implement the neural network as a network that further comprises square scaling nodes on other input branches of the multiplication gates, the square scaling nodes adapted to scale gradients to the weight with a square scaling coefficient $\alpha^2$ that is equal to a square of said scaling coefficient $\alpha$.

17. The computerized hardware system according to claim 15, wherein the system is further configured to train the network according to a training algorithm, so as to iteratively perform steps that comprise, each:

calling scaled connection weight values from the memory, which values span an initial range compatible with said limited range;

based on the scaled connection weight values called, learning new scaled connection weight values, whereby, for each layer of said one or more hidden layers and for each neuron of said each layer:

input values to said each neuron are inversely scaled, thanks to said inverse scaling nodes, based on an inverse scaling coefficient $1/\alpha$, which is an inverse of a scaling coefficient $\alpha$ according to which the connection weight values as called for said each neuron are scaled, so as for values output by said each neuron to remain unaffected by this scaling coefficient $\alpha$, and the scaled connection weight values as called for said each neuron are updated, so as for the updated values to span a final range compatible with said limited range, whereas corresponding unsealed values span an effective range that differs from said final range; and storing the updated, scaled connection weight values on the memory.

18. A computer program product for training a neural network comprising one or more hidden layers of neurons and implemented in a hardware that allows only a limited range for connection weight values of artificial neurons of the network, the computer program product comprising a computer readable storage medium having program instructions embodied therewith, the program instructions executable by one or more processors, to cause to train the network according to a training algorithm, so as to iteratively perform steps that comprise, each:

calling scaled connection weight values from a memory, which values span an initial range compatible with said limited range;

based on the scaled connection weight values called, learning new scaled connection weight values, whereby, for each layer of said one or more hidden layers and for each neuron of said each layer:

input values to said each neuron are inversely scaled, based on an inverse scaling coefficient $1/\alpha$, which is an inverse of a scaling coefficient $\alpha$ according to which the connection weight values as called for said each neuron are scaled, so as for values output by said each neuron to remain unaffected by this scaling coefficient $\alpha$, and the scaled connection weight values as called for said each neuron are updated, so as for the updated values to span a final range compatible with said limited range, whereas corresponding unsealed values span an effective range that differs from said final range; and instructing to store the updated, scaled connection weight values on the memory.

\* \* \* \* \*